United States Patent
Dourra et al.

[11] Patent Number: 6,022,293
[45] Date of Patent: Feb. 8, 2000

[54] ELECTRONIC CONTROL OF TRANSMISSION LINE PRESSURE

[75] Inventors: Hussein A. Dourra, Dearborn Heights; David Parenti, Waterford; Maurice B. Leising, Clawson, all of Mich.

[73] Assignee: Chrysler Corporation, Auburn Hills, Mich.

[21] Appl. No.: 09/168,836

[22] Filed: Oct. 8, 1998

[51] Int. Cl.⁷ ............................ F16H 61/26; F16H 61/12
[52] U.S. Cl. ........................ 477/158; 477/906; 477/174; 475/127
[58] Field of Search .................. 475/120, 127; 477/158, 161, 906, 166, 174, 175, 20, 86

[56] References Cited

U.S. PATENT DOCUMENTS

| | | | |
|---|---|---|---|
| 3,631,744 | 1/1972 | Blomquist et al. . | |
| 3,956,947 | 5/1976 | Leising et al. . | |
| 4,106,367 | 8/1978 | Bouvet | 74/866 |
| 4,289,048 | 9/1981 | Mikel et al. . | |
| 4,505,368 | 3/1985 | Ackermann et al. | 192/103 R X |
| 4,781,080 | 11/1988 | Iwatsuki | 74/867 |
| 4,836,055 | 6/1989 | Suzuki | 74/866 |
| 4,875,391 | 10/1989 | Leising et al. . | |
| 5,060,540 | 10/1991 | Yamaguchi | 74/866 |
| 5,074,167 | 12/1991 | Yoshimura et al. | 74/866 |
| 5,093,789 | 3/1992 | Yoshimura et al. | 74/866 X |
| 5,103,692 | 4/1992 | Shimanaka et al. | 74/857 |
| 5,305,663 | 4/1994 | Leonard et al. | 74/866 |
| 5,449,329 | 9/1995 | Brandon et al. | 477/70 |
| 5,458,545 | 10/1995 | Adam et al. . | |
| 5,630,773 | 5/1997 | Slicker et al. | 477/176 |
| 5,803,869 | 9/1998 | Jamzadeh et al. | 477/168 |

*Primary Examiner*—Charles A Marmor
*Assistant Examiner*—Ha Ho
*Attorney, Agent, or Firm*—Mark P. Calcaterra

[57] ABSTRACT

A method and apparatus are provided for controlling the hydraulic line pressure in an automatic transmission for a vehicle in response to the measured pressure and torque transmitted through the transmission such that a minimum hydraulic line pressure is provided to the frictional elements to achieve a non-slip condition through the transmission which increases transmission efficiency and fuel economy. Hydraulic line pressure is controlled by activating a solenoid activated valve. Control signals are based on measured hydraulic line pressure, engine speed, turbine speed, vehicle speed, driver selected gear, and torque converter operating condition for the solenoid actuated valve. The present invention further provides a closed-loop adaptive control technology to learn the minimum line pressure to compensate for variability in the clutch return springs, friction characteristics, surface finishes, as well as hydraulic wear, and changes over the life of the transmission. Further, when one of the line pressure components fails, the method provides open loop control.

16 Claims, 4 Drawing Sheets

ELECTRONIC CONTROL OF TRANSMISSION LINE PRESSURE

BACKGROUND OF THE INVENTION

1. Technical Field

The present invention relates generally to systems for controlling the hydraulic line pressure in an electronic automatic transmission and, more particularly, to a pressure regulator having a solenoid-actuated valve for adaptively controlling the level of hydraulic line pressure delivered to frictional elements within the transmission based on the difference between transducer sensed line pressure and desired line pressure.

2. Discussion

Generally speaking, land vehicles require three basic components: a power plant such as an internal combustion engine, a powertrain and wheels. The function of the powertrain is to transmit torque generated by the power plant to the wheels thereby providing movement of the vehicle. A powertrain's main component is typically referred to as the transmission. Engine torque and speed are converted in the transmission in accordance with the tractive power demand of the vehicle to propel the vehicle. The vehicle's transmission is also capable of controlling the direction of rotation being applied to the wheels so that the vehicle may be driven both forward and backward.

An automatic transmission typically includes a hydrodynamic torque converter to smoothly transfer engine torque from the engine crankshaft to the transmission input shaft through fluid flow forces. The transmission also includes frictional elements or clutch assemblies which couple the transmission input shaft through one or more planetary gear sets to provide various ratios of torque to the transmission output shaft. The output shaft is usually connected to the drive wheels via a differential.

A hydraulic control assembly engages and disengages the frictional elements which transfer torque through the transmission and effect gear changes in the transmission. Various components, such as spring-biased spool valves, spring-biased accumulators and ball check valves, direct and regulate the fluid flow in the hydraulic control assembly. A hydraulic pump provides fluid pressure and flow rate to energize the hydraulic components in the assembly. Sufficient hydraulic line pressure is required to engage the frictional elements and prevent slippage therebetween to transmit torque from the transmission input shaft to the transmission output shaft. If insufficient line pressure is provided, the frictional elements do not fully engage and slip occurs resulting in power loss and damage to the transmission. Conversely, if excessive line pressure is provided, the hydraulic pump torque is higher than necessary resulting in decreased fuel efficiency of the vehicle.

On level ground, constant throttle and low-load conditions, high line pressure is not required to prevent the clutches from slipping. Since the line pressure is produced by utilizing energy from the engine, a lower pressure demand consumes less energy from the engine. Therefore, controlling the operating parameters to adjust the pressure requirements based on transmission needs reduces parasitic losses and improves powertrain efficiency.

It is well known that a fixed displacement pump and a pressure regulator may be used to maintain the appropriate line pressure. These systems rely on springs to provide a predetermined fluid flow rate and pressure for various operating conditions. Thus, once the transmission is designed, the operating condition of the hydraulic system is fixed. It is also well known to use a variable displacement pump in place of the fixed displacement pump and pressure regulator. These pumps are considerably more costly than fixed displacement pumps.

A thorough description of general automatic transmission design principles may be found in "Fundamentals of Automatic Transmissions and Transaxles", Chrysler Corporation Training Manual No. TM-508A. Additional descriptions of automatic transmissions may be found in co-assigned U.S. Pat. No. 3,631,744, entitled "Hydrodynamic Transmission", issued on Jan. 4, 1972 to Blomquist, et al., and U.S. Pat. No. 4,289,048, entitled "Lock Up system for Torque Converter", issued on Sep. 15, 1981 to Mikel, et al. These patents are hereby incorporated by reference.

In recent years, a more advanced form of transmission control system has been proposed, which offers the possibility of enabling the transmission to learn and adapt itself to changing conditions. In this regard, co-assigned U.S. Pat. No. 3,956,947, issued on May 18, 1976 to Leising, et al. and U.S. Pat. No. 5,458,545, issued Oct. 17, 1995 to Adam et al., set forth a fundamental development in this field and are hereby incorporated by reference. Specifically, these patents disclose automatic transmission designs which feature an adaptive control system that includes electronically operated solenoid-actuated valves for providing closed-loop control of various functions in the hydraulic control assembly.

3. Objects of the Present Invention

In view of the foregoing, it is one of the principal objects of the present invention to provide a system for continually controlling the hydraulic line pressure in an automatic transmission such that the minimum line pressure necessary for full engagement of the frictional elements based on the characteristics and current operating condition of the automatic transmission is provided thereby improving transmission efficiency and increasing the fuel economy of the vehicle.

It is another object of the present invention to provide a control system for controlling hydraulic line pressure based on transducer sensed line pressure input to a transmission controller.

It is yet another object of the present invention to provide an adaptive system for controlling the hydraulic line pressure having a fast response time, allowing the control strategy to operate at minimum line pressure levels, yet increasing line pressure quickly when necessary.

It is another object of the present invention to learn the minimum pressure required by actually lowering the pressure until slip is observed (measured). The amount of slip, however, is so small that no disturbance is noticed by the driver.

It is still yet another object of the present invention to provide a method for controlling the hydraulic line pressure in an automatic transmission such that a minimum required line pressure is provided to frictional elements to prevent them from slipping thereby improving transmission efficiency and increasing the fuel economy of the vehicle.

It is a further object of the present invention to provide a method for adaptively controlling the hydraulic line pressure, such that corrections to the methodology are incorporated based on prior operational conditions of the transmission operation.

It is yet another object of the invention is to provide a control system where the control actuation can be continuously corrected as a function of target pressure and operating pressure.

SUMMARY OF THE INVENTION

To achieve the foregoing and other objects, a hydraulic control system for an automatic transmission is provided which is responsive to certain operating conditions such that the minimum hydraulic line pressure is provided to the frictional elements of the transmission to maintain the torque transmitted through the transmission. The present invention provides a method and apparatus which utilizes control technology to provide a minimum hydraulic line pressure to prevent slip and compensate for variations in operating conditions. The hydraulic control system utilizes various operational parameters such as engine speed, turbine speed, output speed (vehicle speed), hydraulic line pressure, driver selected gear, the operating gear and the torque converter operating condition to generate control signals for adjusting the hydraulic line pressure applied to the frictional elements of the transmission system.

More particularly, the present invention provides a method and apparatus which utilizes closed-loop adaptive control technology to learn the optimum line pressure requirements to prevent slip in a transmission based on current operational conditions. The adaptive control system performs its functions in real time, i.e., the system implements an action which affects the output, reads the effect, and adjusts the action continuously. For example, a desired hydraulic line pressure level is determined by the transmission controller based upon current torque and shift requirement parameters (see '545 patent). The actual hydraulic line pressure is read from a transducer coupled to the line. Based upon the difference between the actual and desired line pressure, the line pressure is adjusted via a regulator valve controlled by solenoid duty cycle.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
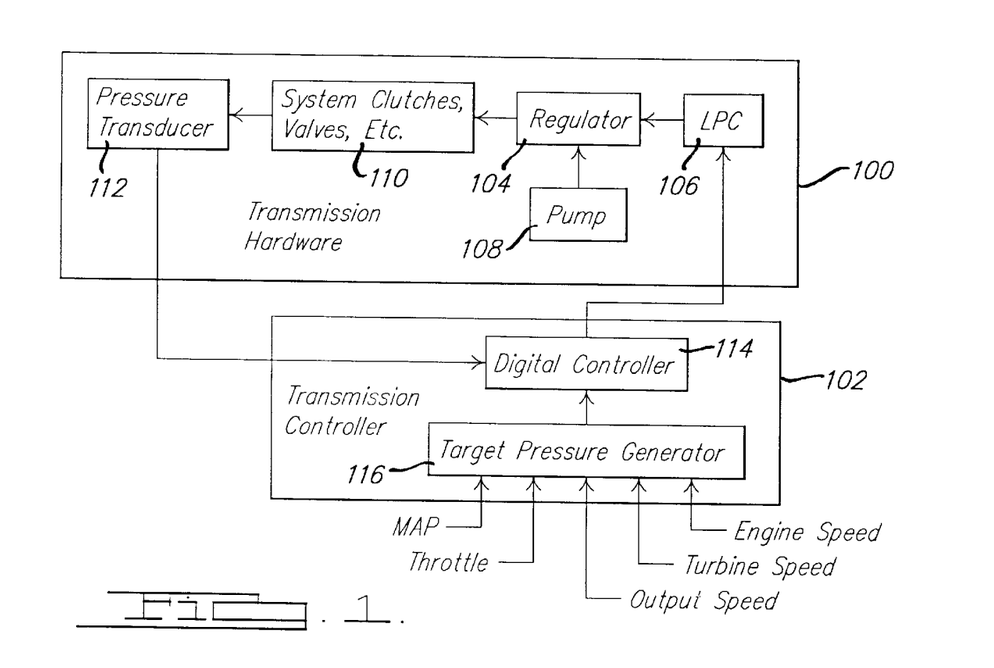
FIG. 1 is a block diagram of the transmission hardware and controller of the present invention.

One embodiment of the present invention is illustrated in block form in FIG. 1. As can be seen, transmission hardware 100 is connected to an operatively controlled by a transmission controller 102. The transmission hardware 100 includes a regulator 104 interdisposed between a line pressure control (LPC) solenoid actuated valve 106, a pump 108, and a clutch and valve transmission subassembly 110. A pressure transducer 112 is operatively disposed adjacent the subassembly 110 so as to detect the hydraulic line pressure throughout the hydraulic system interconnecting the regulator 104, LPC 106, pump 108 and subassembly 110. The pressure transducer 112 is electrically coupled to a digital controller 114 of the transmission controller 102. As such, a signal representative of the pressure within the transmission hydraulic system may be communicated to the digital controller 114 for further processing.

A target pressure generator 116 communicates with the digital controller 114. The target pressure generator 116 delivers a signal to the digital controller 114 indicative of a desired pressure for the transmission hydraulic system. The desired pressure changes depending on the specific operating parameters of the vehicle. Thus, the output of the target pressure generator 116 is based on various operational inputs such as engine speed, turbine speed, output speed, throttle, MAP, etc. For a thorough description of the generation of the target pressure, reference should be made to the above-identified '545 patent as well as to U.S. Pat. No. 4,875,391, entitled "An Electronically Controlled, Adaptive Automatic Transmission System" which issued on Oct. 24, 1989 to Leising, et al. (the '391 patent), and is hereby incorporated by reference.

Once determined, the target pressure generator 116 delivers the target pressure value to the digital controller 114. The digital controller 114 compares the target pressure from the target pressure generator 116 to the actual pressure as read by the transducer 112. Based upon this difference, the digital controller 114 varies the setting of the LPC 106 which varies the fluid flow and pressure through the regulator 104 from the pump 108 to the subassembly 110. As such, the pressure within the hydraulic system is varied. As described in greater detail below, the digital controller 114 may continue to operate in this closed loop mode or may also operate in an open loop mode to control the hydraulic pressure. In the closed loop mode, the pressure transducer 112 continues to send actual pressure readings to the digital controller 114 which compares them to the target pressure determined by the target pressure generator 116 based on system inputs. In the open loop mode, the digital controller 114 controls the LPC 106 based on a pre-selected schedule of LPC settings.

METHOD OF LINE PRESSURE CONTROL

As stated above, the present invention provides for adaptive control of hydraulic line pressure to the multi-clutch assembly 110 and various clutches therein during operation of all forward gears. This line pressure control is active except during shifts and EMCC operation or partial lock-up (PLU) of the torque converter when a preset hydraulic line pressure is maintained. When active, the method continuously controls hydraulic line pressure to a target level based upon instantaneous torque and shift requirements.

At times, the method of controlling transmission fluid line pressure according to the present invention uses negative feedback control. Based on the voltage input from the transducer 112, a "Duty Cycle" (DC) output is calculated. The DC output produces an electric current through the LPC valve 106 which varies fluid flow to the regulator valve 104 controlling line pressure. In this case, duty cycle is defined as the percent of time the LPC valve 106 is energized over a given time period such as 14 msec.

Figure 2:
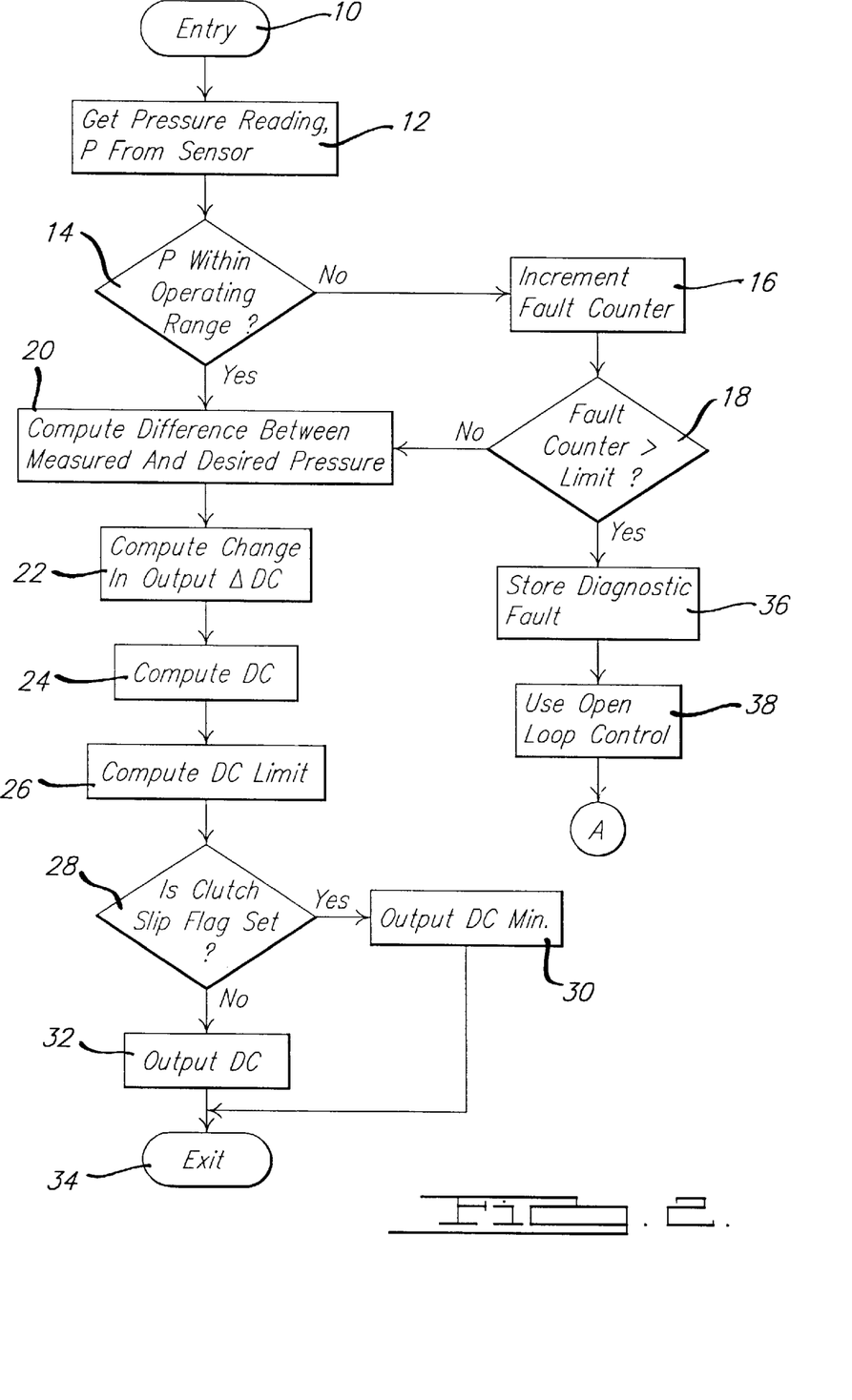
FIG. 2 is a flowchart of the method for controlling the hydraulic line pressure.

Turning to FIG. 2, a flowchart of the method for controlling the hydraulic line pressure and the transmission according to the present invention is illustrated. The methodology is run periodically as called for by the transmission controller 102, for instance, every seven milliseconds. The methodology enters at bubble 10 and falls through to block 12 where the actual pressure (P) within a hydraulic line is read from the transducer 112. From block 12, the methodology continues to decision block 14 where it determines whether the actual pressure P is within an acceptable operating range. For instance, the actual pressure should be below 250 and above 25 PSI during normal operation.

If the actual pressure is not within an acceptable range at decision block 14, the methodology continues to block 16 and increments a fault counter (described in greater detail below). From block 16, the methodology continues to decision block 18. In decision block 18, the methodology determines if the value within the fault counter is greater than a preselected limit. This fault counter limit establishes an acceptable tolerance for the control methodology. If the fault counter value is less than the limit at decision block 18, or if the actual pressure is within the acceptable operating range in decision block 14, the methodology continues to block 20. In block 20, the methodology computes a difference (E) between the actual pressure (P) and the desired pressure (P*):

$$E = \text{measured pressure (P)} - \text{desired pressure (P*)}.$$

As noted above, the desired pressure level is determined by the electronic transmission controller 102 based upon the torque and shift requirements of the transmission under current operating conditions (i.e., feedback).

Figure 5:
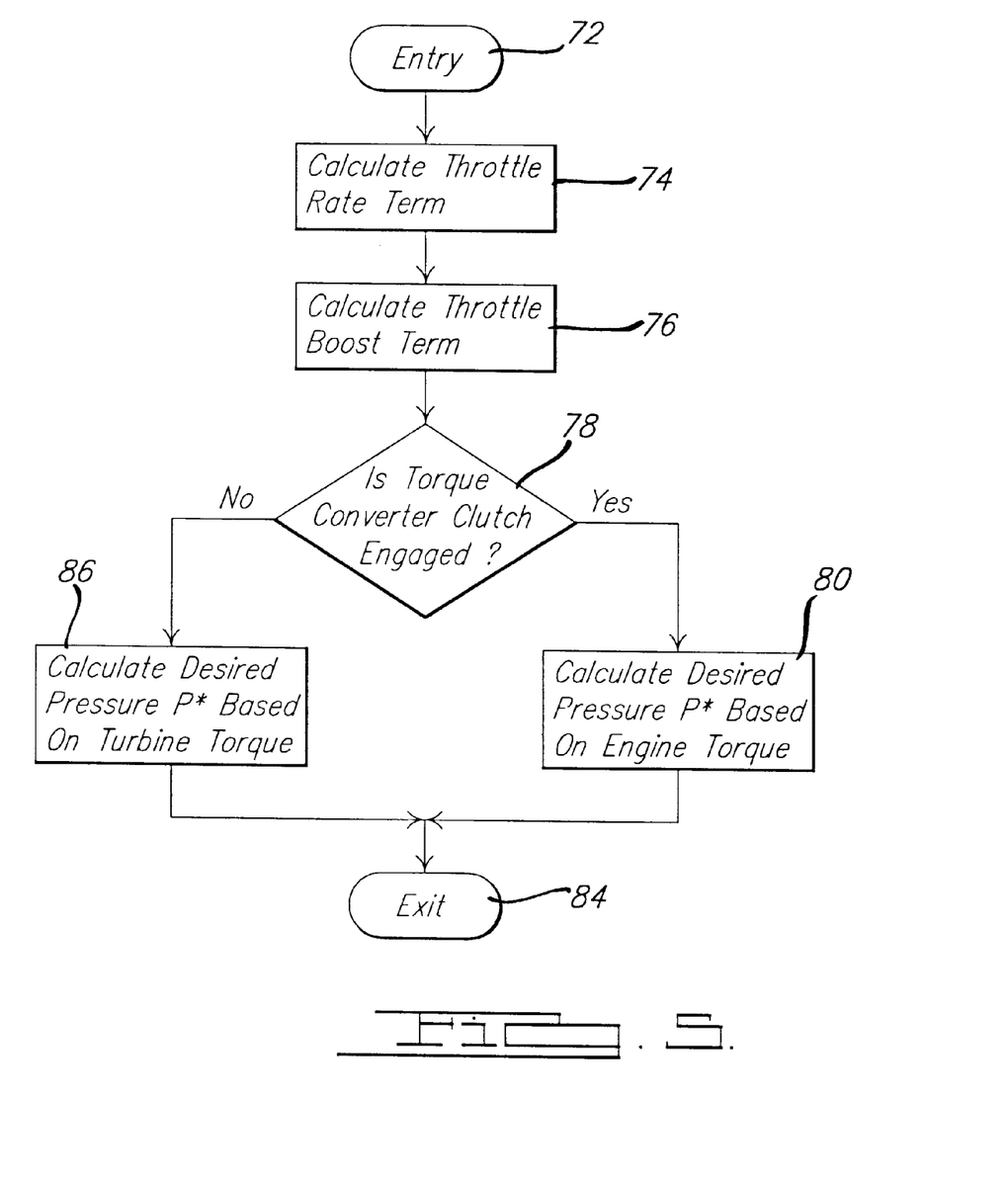
FIG. 5 is a flowchart of a method of determining a desired pressure according to the present invention.

FIG. 5 depicts a flowchart of a method for determining a desired pressure P* for a given set of environmental conditions according to the present invention. This methodology starts in bubble 72 and falls through to block 74 where it calculates the throttle rate term $\Delta P^*_{THR}$ which is used to increment desired pressure P* based on throttle rate:

$$\Delta P^*_{THR}(i) = 15K\Delta thr, \text{ if } \Delta P^*_{THR}(i-1) < 15K\Delta thr,$$
$$= 30K\Delta thr, \text{ if } \Delta P^*_{THR}(i-1) > 30K\Delta thr,$$
$$= \Delta P^*_{THR}(i-1), \text{ if } 15K\Delta thr \leq \Delta P^*_{THE}(i-1) \leq 30K\Delta thr,$$

-continued
$$= 0 \text{ at startup or shift-in-progress, and}$$
$$\Delta thr = THR - thr_f(i), \text{ and } \Delta thr \text{ is limited to} < 40 \text{ degrees,}$$

where:
K=a gain factor based on torque capacity, and
$thr_f(i) = thr_f(i-1) + (THR - thr_f(i-1))/64$, Limit $thr_f \leq THR$. THR is the current throttle angle position sensor reading.

From block 74, the methodology continues to block 76 and calculates the throttle boost term:

$$P^*_B = 2(THR_s - 17°), \quad P^*_B \leq 0 \text{ psi}$$

where:

$$THR_s = \text{Throttle Offset,}$$
$$= THR \text{ when } THR \geq 20°, \text{ and}$$
$$= 0E \text{ when } THR < 20°.$$

From block 76, the methodology continues to decision block 78 and determines if the torque converter clutch is engaged. If the torque converter clutch is engaged at decision block 78, the methodology continues to block 80. In block 80, the methodology calculates the desired pressure P* based on net engine torque which, in this case, is equal to turbine torque $T_t$:

$$P^* = K_{tc}(1 + MLP/64)T_t + P^*_B + \Delta P^*_{THR},$$

where:
$K_{tc}$=a gain factor based on torque capacity,
MLP=a minimum line pressure adjustment value, and
$T_t$=Turbine Torque.

However, if the torque converter clutch is not engaged at decision block 78, the methodology continues to block 82. In block 82, the methodology calculates desired pressure P* based on turbine torque and a constant:

$$P^* = 15 + K_{tc}(1 + MLP/64)T_t + P^*_B + \Delta P^*_{THR}.$$

The input torque is measured, if possible. Otherwise, input torque is calculated as a function engine torque, turbine and output speed:

$$= T_e - L_1 \text{ when the converter clutch is}$$
$$\text{engaged (block 80) and}$$
$$= [C_0(N_e) + C_1(N_e - N)] \times N_e(10^{-6}) \text{ when the}$$
$$\text{converter clutch is not engaged (block 82), where:}$$

$L_1$=Engine torque losses,
$T_c$=Engine torque in foot-pounds,
$N_e$=Engine speed in revolutions per minute,
$N_t$=Torque converter turbine speed in revolutions per minute,
$C_0 C_1$=Constants based on type of torque converter used.

P* LIMITS

It should also be noted that the desired pressure P* is held within a preselected limit between a maximum desired pressure and a minimum desired pressure, Limit $P^*_{min} \leq P^* \leq P^*_{max}$. $P^*_{max}$ is defined to be the maximum operating pressure of transmission. P* is set to $P^*_{max}$ under all special conditions that require a consistent high line pressure level. The minimum operating pressure is set as follows:

$$P^*_{min} = P_{low}[1+MLP(i)/64] + \Delta P^*_{THR}$$

where:

$P_{low}$ = Minimum achievable pressure dependent upon transmission hardware.

After calculating the desired pressure P* in block 82 or block 80, the data is used at block 20 of FIG. 2. From blocks 80 and 82, the methodology continues to bubble 84 where it exits the routine.

Referring again to FIG. 2, from block 20, the methodology continues to block 22 to determine the change in output duty cycle. That is, based upon the difference (E) between the actual pressure (P) and desired pressure (P*), the hydraulic line pressure is adjusted via the regulator valve 104 controlled by solenoid duty cycle (DC) as shown in the following equation:

$$\delta DC = G[-\delta DC(I-1) + 0.39E(I) - 0.28E(I-1)]$$

where:

DC=Duty cycle applied, and

G=Gain factor which is proportional to the transmission oil temperature. From block 22, the methodology continues to block 24 to compare duty cycle:

$$DC(I) = DC(I-1) + \delta DC$$

From block 24, the methodology continues to block 26 to compare the duty cycle limit according to battery voltage and oil temperature as shown in the table below:

| TEMP ° F. | BATTERY VOLTAGE | | |
|---|---|---|---|
| | 10 V | ... | 16 V |
| 0° | $DC_{maxll}$ | ... | $DC_{maxml}$ |
| . | . | ... | . |
| . | . | ... | . |
| . | . | | . |
| 300° | $DC_{maxln}$ | ... | $DC_{maxmn}$ |

The LPC valve 106 preferably used in the present invention has an operating range of approximately 0–50% duty cycle. Running the solenoid 106 at duty cycle values above the saturation point ($DC_{max}$) is undesirable and unnecessary since the only effect is to dissipate more power in the driver circuit, generating additional heat and reducing durability. $DC_{max}$ is dependent upon the voltage across the coil and temperature. Based on data submitted by the solenoid supplier, a relationship is defined for $DC_{max}$ vs. voltage and temperature. Since the relationship is non-linear, the table is used to approximate $DC_{max}$ for a transmission temperature range between 0–300° F. and battery voltage range between 10–16 volts. Linear interpolation is used between table data points.

Figure 4:
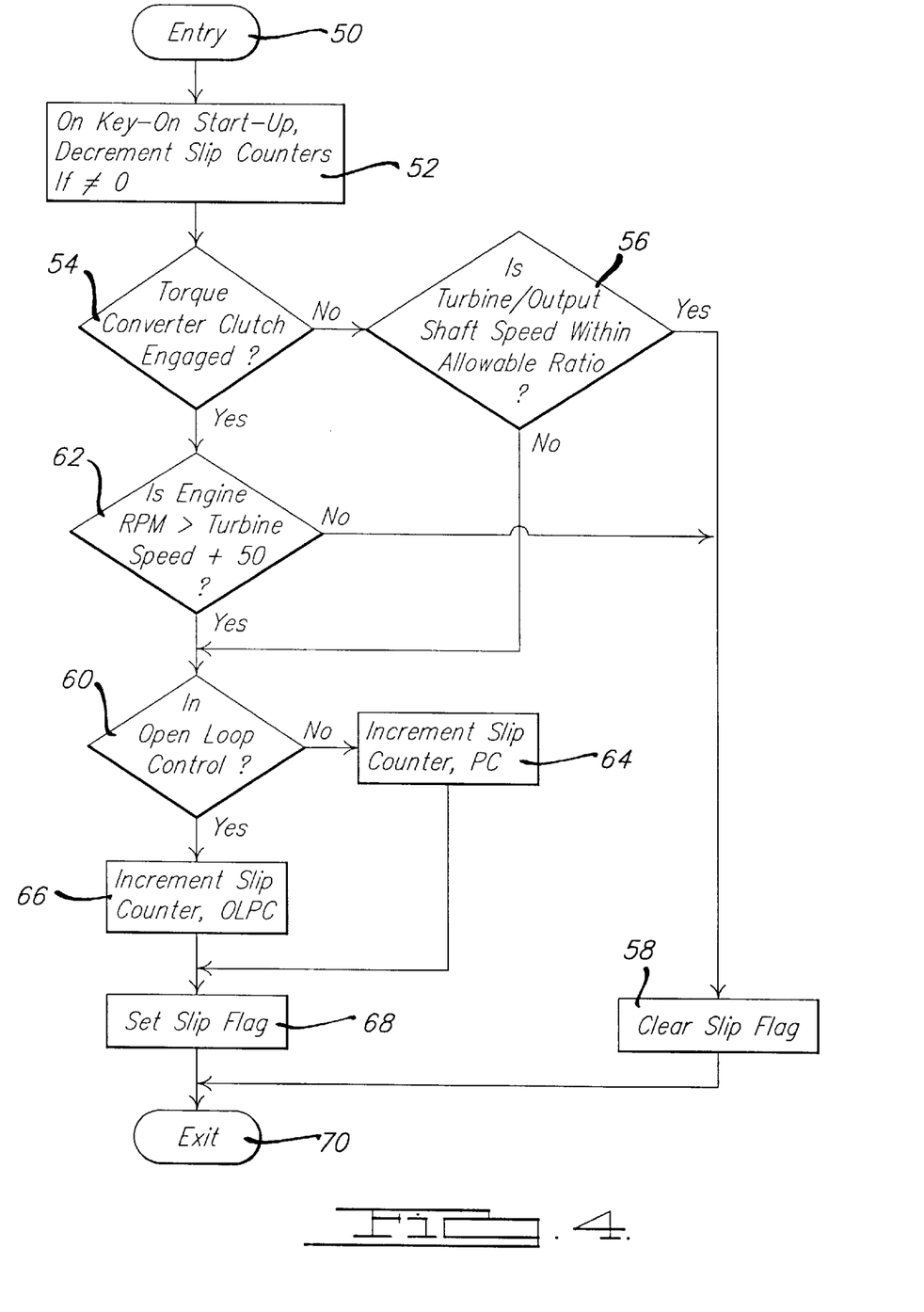
FIG. 4 is a flowchart of a method for reacting to clutch slip according to the present invention.

From block 26, the methodology continues to decision block 28 where it determines if the clutch slip flag has been set. Turning now to FIG. 4, a flowchart of a method for determining a clutch slip occurrence according to the present invention is illustrated. In order to keep slippage and the resulting additional clutch wear to a minimum, special action is taken. Upon detection of a slip condition, the control system bypasses closed-loop control and immediately boosts line pressure to its achievable maximum (DC=$DC_{min}$) for a programmable period of time (~1 second). This stops the slip condition before damage to the clutches can occur. The system then returns to normal closed-loop control but with the minimum desired pressure increased slightly with use of the variable "MLP" in the calculation of desired pressure P*. MLP is "Minimum Line Pressure" adjustment amount and is used to compensate for clutch slippage when in-gear.

More particularly, the method for clutch slip control enters at bubble 50 and falls through to block 52 where the slip counter is decremented at key-on start-up if the slip counter does not equal zero. From block 52, the methodology continues to decision block 54 to determine if the torque converter clutch is fully engaged. If the torque converter clutch is not fully engaged at decision block 54, the methodology continues to decision block 56 to determine if the turbine and output shaft speeds are within an allowable ratio. For instance, since output speed times gear ratio equals turbine speed, the measured turbine speed should be within a tolerance of about 30 rpm. If the turbine and output shaft speeds are within the allowable ratio, the methodology advances from decision block 56 to block 58 and clears the clutch slip flag. However, if the turbine and output shaft speeds are outside of the allowable ratio, the methodology advances from decision block 56 to decision block 60.

Returning to decision block 54, if the torque converter clutch is fully engaged, the methodology advances from decision block 54 to decision block 62. In decision block 62, the methodology determines if the engine rpm is greater than the turbine speed plus a tolerance factor such as 50 rpm. If the engine rpm is not greater than the turbine speed plus the tolerance factor at decision block 52, the methodology advances to block 58 and clears the slip clutch flag. However, if the engine rpm is greater than the turbine speed plus the tolerance factor at decision block 62, the methodology advances to decision block 60.

In decision block 60, the methodology determines if it is operating in open loop control. If not, the methodology continues to block 64 and increments the slip counter to the value PC. However, if the methodology is operating in open loop control at decision block 60, the methodology continues to block 66 and increments the slip counter to the value OLPC. OLPC is "Open Loop Pressure Count" and compensates for clutch slippage when in-gear and open loop. After incrementing the slip counter at either block 64 or block 66, the methodology advances to block 68 and sets the clutch slip flag. After setting the clutch slip flag at block 68, or clearing the clutch slip flag at block 58, the flag setting is used in the decision block 28 of FIG. 2. Thereafter, the methodology exits the routine at 70.

The methodology described above with respect to FIG. 4 may also be represented mathematically as follows. The transmission controller controls the LPC valve 106 according to the following control equation which may be performed at 7 msec intervals(i):

$$DC(i) = DC(i-1) + \delta DC(i); \text{ Limit } DC_{min} \leq DC \leq DC_{max}.$$

The variable DC(i) is set such that $DC(i) = DC_{min}$ when gear train clutches or the torque converter clutch slips if line pressure is too low to maintain torque capacity. When the pressure sensor feedback signal fails (SFLT), DC(i) is set such that $DC(i) = DC_{OL}$ (open loop, see FIG. 2) where:

DC(i): current calculated DC to be output to the LPC valve which is inversely proportional to line pressure, DC(i−1): calculated DC from previous interval, and 6DC(i): adjustment to the DC determined by the closed-loop feedback control equation:

$$\delta DC(i) = G[-\delta DC(i-1) + C_{G1}E(i) - C_{G2}E(i-1)]$$

where:

| | |
|---|---|
| G | = temperature dependent "gain" factor, |
| | = $C_{G3}$ × (Transmission Temperature) + $C_{G4}$, |
| $C_{G1}, C_{G2}$ | = feedback gain constants, |
| $C_{G3}, C_{G4}$ | = temperature factor gain constants, |
| E(i) | = current error, |
| | = actual measured |
| | = pressure (P) − desired pressure (P*), |

E(i−1)=calculated error from previous interval, $DC_{min}$: Minimum duty cycle based on operating range of the LPC valve, $DC_{max}$: Maximum duty cycle based on operating range of the LPC valve, $K, K_{tc}$=gain factors dependent upon clutch torque capacity, MLP(i)=Minimum Line Pressure adjustment (Battery Backed RAM), (MLP is incremented by 8 when slippage is detected and decremented by 1 each time vehicle is started and is Limited to: 0≤MLP ≤64), and MLP(i−1)=Minimum line pressure adjustment from previous interval. The effect of decrementing MLP is to lower line pressure for all conditions. The desired line pressure, P*, is deliberately biased so that slip will only occur at light throttle (e.g. ≤20%). This ensures that the slip will be so slight that no noticeable disturbance occurs.

Returning now to FIG. 2, if the clutch slip flag is set at decision block 28, the methodology advances to block 30 and sets the duty cycle output to the minimum duty cycle $DC_{min}$. If the clutch slip flag is not set at decision block 28, the methodology continues to block 32 and uses the duty cycle output computed from block 24. After setting the duty cycle to the appropriate value in block 30 or 32, the methodology continues to bubble 34 where it exits the routine pending a return therethrough upon demand by the transmission controller.

Returning to decision block 18, if the fault counter is greater than the preselected limit, the methodology advances from decision block 18 to block 36 and stores the diagnostic fault. A sensor diagnostic test is used to detect an open or short in the pressure transducer circuit. This test runs every program loop time (7 msec). If a problem is detected, the failure is reported to diagnostics and testing of the circuit is continued for recovery.

The Sensor Fault (SLFT) flag is set if the sensor fault counter SFCTR>200. The SLFT flag is cleared if SFCTR<180. The counter is incremented as follows:

SFCTR=SFCTR+8, if analog to digital convertor (A/D) input voltage outside operating range, SFCTR=SFCTR−1, if A/D input voltage within operating range, and SFCTR=0 at Startup.

If the SFLT flag is set, the sensor failure is reported to Diagnostics.

Figure 3:
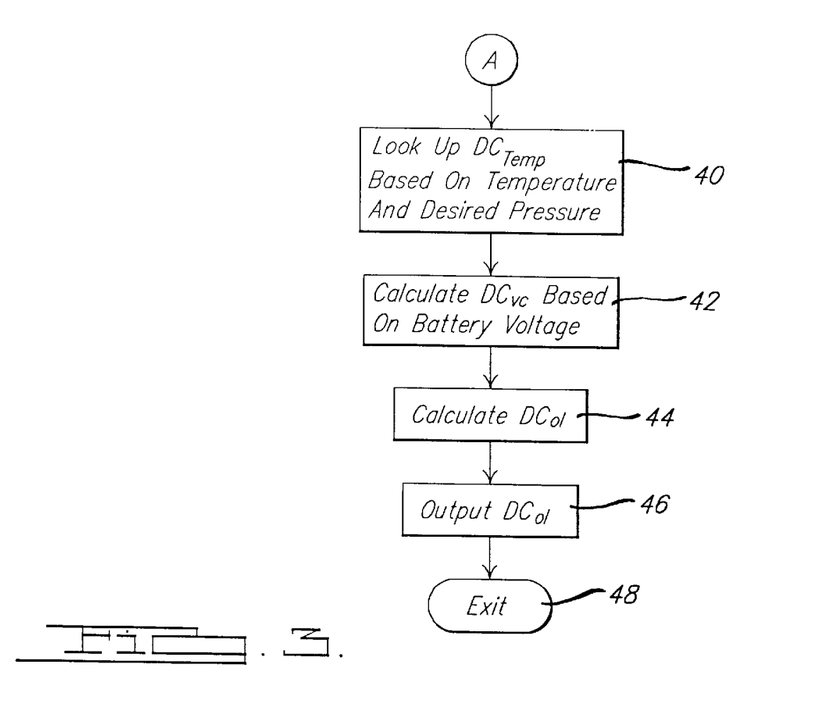
FIG. 3 is a flowchart of an open loop control methodology of the present invention.

After reporting the failure condition to diagnostics at block 36, the methodology continues to block 38 and implements open loop control of the system which is illustrated in FIG. 3. Referring to FIG. 3, if the signal from the transducer 112 becomes unreliable due to an electrical circuit failure, the LPC valve 106 is operated at a duty cycle which produces pressures at or near maximum desired pressure ($P^*_{max}$), i.e., open loop control (no feedback). In block 40 the methodology looks up $DC_{Temp}$ based on temperature and desired pressure. $DC_{Temp}$ is based on test data taken over a temperature range of 40° F. to 300° F. with linear interpolation used between table data points:

| Temperature (° F.) | $DC_{Temp}$ |
|---|---|
| 40° | $DC_{Temp1}$ |
| 0° | $DC_{Temp2}$ |
| 300E | $DC_{Temp3}$ |

From block 40, the methodology continues to block 42 where it calculates $DC_{vc}$ based on battery voltage:

$$DC_{vc} = \text{voltage compensation},$$
$$= 3(13 - \text{battery voltage}).$$

From block 42, the methodology continues to block 44 and calculates $DC_{OL}$:

$$DC_{OL} = \text{Open loop duty cycle},$$
$$= DC_{Temp} + DC_{vc} - (OLPC/5.12);$$
$$\text{Limit } DC_{min} \leq DC_{OL} \leq DC_{max}.$$

Note that OLPC is incremented by 8 when clutch slippage is detected and decremented by 1 each time vehicle is started and is limited, OLPC≤64. Thus, The DC output is based upon test data, voltage compensation, and occurrence of clutch slip. From block 44, the methodology continues to block 46 and outputs $DC_{OL}$. From block 46 the methodology falls through to bubble 48 and exits the subroutine.

A malfunction of the line pressure control system is determined from operating outside the acceptable control window and not achieving desired pressure level as defined below. The line pressure fault flag LPFF is set when the line pressure fault counter LPFC(i)=255 and is cleared at startup, where:

$LPFC(i)$ = Line Pressure Fault Count; Limit $LPFC(i) \geq 0$,

= $LPFC(i-1)$, if $P > 50\text{psi}$ and $DC \geq DC_{max} - 1\%$,

= $LPFC(i-1) + 1$, if $P^* + 10 < P < P^* - 10$ and $SFCTR < 16$,

= $LPFC(i-1) - 2$, if $P^* - 5 < P < P^* + 5$ and $SFCTR < 16$,

= $LPFC(i-1)$ otherwise, and

= 0 at startup.

The line pressure low flag LPLF is set when the line pressure low counter LPLC(i)=150 and is cleared at startup, where:

$LPLC(i)$ = Line Pressure Low Count; Limit $LPLC(i) \geq 0$

= $LPLC(i-1) + 1$, if $P \leq P^* - 10$ and $DC < DC_{min} + 2$ and $SFCTR < 16$, = $LPLC(i-1) - 2$, if $P \geq P^* - 10$ and $DC \geq DC_{min} + 2$ and $SFCTR < 16$, and = 0 at startup The line pressure high flag LPHF is set when the line pressure high counter LPHC(i)=255 and is cleared at startup, where:

$LPHC(i)$ = Line Pressure High Count; Limit $LPHC(i) \geq 0$,

= $LPHC(i-1) + 1$, if $P > 120$ and $DC \leq DC_{max} - 2$ and $SFCTR < 16$,

= $LPHC(i-1) - 2$, if $P \geq P^* - 10$ or $DC \leq DC_{max} - 2$ and $SFCTR < 16$, and = 0 at startup.

If the LPLF is set, the methodology reports a system failed low condition to Diagnostics. If the LPFF is set, the methodology reports a system off-target condition to Diagnostics. If the LPHF is set, the methodology reports a system failed high condition to Diagnostics. It should be noted that the methodology does not check for the Line Pressure Low Flag (LPLF) or Line Pressure Fault Flag (LPFF) during shut down, during the first 10 seconds after startup, when engine RPM <(14×P*), or while performing special system functions. When a fault flag is set, pressure control is again maintained through an open loop strategy as described above.

The primary benefit of the improved control system is a reduction of pump pressure to the minimum required level which reduces parasitic losses to a minimum and improves fuel economy. Additionally, the fixed line pressure levels during shifts can be optimized providing consistent shift quality.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling a hydraulic line pressure in an automatic transmission comprising:
    sensing an actual pressure in said hydraulic line;
    computing a target pressure for said hydraulic line based on operation conditions;
    comparing said actual pressure to a desired pressure;
    adjusting said hydraulic line pressure according to a difference between said actual pressure and said desired pressures;
    determining if a malfunction exists in a circuit controlling said sensing step; and
    setting said hydraulic line pressure according to a preselected schedule based on engine temperature if said malfunction is detected.

2. The method of claim 1 wherein said sensing step further comprises placing a transducer on said hydraulic line and delivering a pressure reading from said transducer to a controller.

3. The method of claim 1 wherein said computing step further comprises combining throttle rate, throttle boost, and turbine torque.

4. The method of claim 1 wherein said adjusting step further comprises changing the duty cycle delivered to a solenoid controlling a hydraulic line regulator.

5. The method of claim 4 wherein said duty cycle is prescribed within limits set by oil temperature and battery voltage.

6. The method of claim 1 further comprising:
    determining if a clutch slip condition exists; and
    boosting said pressure to a maximum if said clutch slip condition is detected.

7. The method of claim 6 further comprising:
    adjusting a minimum level of said desired pressure upwardly after said clutch slip condition is detected.

8. The method of claim 6 further comprising:
    biasing said desired pressure such that said clutch slip condition will only occur at a light throttle setting so that said clutch slip condition causes no noticeable disturbance.

9. The method of claim 1 further comprising:
    determining if a malfunction exists in a circuit controlling said adjusting step; and
    setting said pressure according to a preselected schedule based on engine temperature if said malfunction is detected.

10. A hydraulic system in an automatic transmission comprising:
    a pump causing hydraulic fluid to flow through the hydraulic system;
    a pressure regulator regulating the hydraulic pressure in the automatic transmissions;
    a line pressure detector measuring the hydraulic line pressure in the automatic transmission; and
    a line pressure controller adjustably selecting and controlling the pressure regulator, said line pressure controller being responsive to the hydraulic line pressure measured by said line pressure detector and a desired hydraulic line pressure determined according to various operating parameters such that the pump generates an optimum hydraulic line pressure necessary to maintain the torque transmitted from an input shaft of the automatic transmission to an output shaft of the automatic transmission, wherein the line pressure controller includes a solenoid actuated valve which can be energized according to a duty cycle to vary the hydraulic pressure acting on the pressure regulator, a controller for controlling the actuation of the pressure regulator by making adjustments to the duty cycle of the solenoid actuated valve according to throttle rate, throttle boost, turbine torque and clutch slip, and a malfunction detector for adjusting the actuation of the pressure regulator by making adjustments to the duty cycle of the solenoid actuated valve in response to either a malfunction of said line pressure detector or said line pressure controller.

11. The hydraulic system of claim 10, wherein the line pressure controller sets the duty cycle of said solenoid actuated valve to zero when a clutch slip condition is detected thereby maximizing the line pressure in said hydraulic system.

12. The hydraulic system of claim 10, wherein the line pressure controller sets the duty cycle of said solenoid actuated valve to zero when said malfunction is detected thereby maximizing the line pressure in said hydraulic system.

13. A method of controlling a hydraulic line pressure in an automatic transmission comprising:

sensing an actual pressure in said hydraulic line;

computing a target pressure for said hydraulic line based on operation conditions;

comparing said actual pressure to a desired pressure;

adjusting said hydraulic line pressure according to a difference between said actual pressure and said desired pressure;

determining if a malfunction exists in a circuit controlling said adjusting step; and setting said pressure according to a preselected schedule based on engine temperature if said malfunction is detected.

14. The method of claim 13 further comprising:

determining if a clutch slip condition exists; and boosting said pressure to a maximum if said clutch slip condition is detected.

15. The method of claim 14 further comprising:

adjusting a minimum level of said desired pressure upwardly after said clutch slip condition is detected.

16. The method of claim 14 further comprising:

determining if a malfunction exists in a circuit controlling said sensing step; and setting said hydraulic line pressure according to said preselected schedule based on engine temperature if said malfunction is detected.

* * * * *